United States Patent [19]

Kolb

[11] Patent Number: 5,259,235
[45] Date of Patent: Nov. 9, 1993

[54] PRESSURE STANDARD

[75] Inventor: Kenneth A. Kolb, Houston, Tex.

[73] Assignee: Ruska Instrument Corporation, Houston, Tex.

[21] Appl. No.: 831,883

[22] Filed: Feb. 6, 1992

[51] Int. Cl.$^5$ .................... G01L 7/16; G01L 27/00
[52] U.S. Cl. ................................. 73/4 D; 73/744
[58] Field of Search ............... 73/4 D, 4 R, 744, 745, 73/746

[56] References Cited

U.S. PATENT DOCUMENTS

| 3,034,357 | 5/1962 | Brown | 73/744 |
| 3,267,719 | 8/1966 | Wagner et al. | 73/4 D |
| 3,961,533 | 6/1976 | Bennett | 73/744 |

OTHER PUBLICATIONS

"DHL Pressure Standards", D.H. Instruments, Inc., 10 pages, technical bulletin.
Ruska Technical Bulletin entitled "Model 5201, 0.04% Rdg. Hydraulic Deadweight Tester", 6 pages Ruska Instrument Corporation.
Ruska Technical Bulletin entitled "Model 2492, Automated, Deadweight Gage", 4 pages, 1988, Ruska Instrument Corporation.
Ruska Technical Bulletin entitled "Model 2465, 1991 psi, Gas-Lubricated Piston", Pressure Gage, 3 pages, Ruska Instrument Corporation, 1990.
Ruska Technical Bulletin entitled "Deadweight Gages", 2 pages, Ruska Instrument Corporation, 1989.
Ruska Technical Bulletin entitled "Digital Transfer Standards" 2 pages, Ruska Instrument Corporation, 1989.
Ruska Technical Bulletin entitled "Precision Pressure Standards" 6 pages, Ruska Instrument Corporation.

*Primary Examiner*—Donald O. Woodiel
*Attorney, Agent, or Firm*—Browning, Bushman, Anderson & Brookhart

[57] ABSTRACT

A differential pressure gage apparatus is disclosed which utilizes two pistons movable within three bores to produce accurate differential pressures. An inner piston carried by an outer piston has sufficient length to extend into all bores at once.

18 Claims, 2 Drawing Sheets

PRESSURE STANDARD

BACKGROUND OF THE INVENTION

1. Field of the Invention

The present invention relates to an improved differential pressure gage. More specifically, the present invention is directed to a new, novel differential pressure gage employing multiple coaxial measuring cylinder bores with associated reciprocal inner and outer measuring pistons.

2. Description of the Background

Accuracy in pressure measurement instruments is important for many applications such as flow measurement, petroleum reservoir analysis, medical gas testers and transducers, hydrostatic depth transmitters, and oxygen system testers. However, the accuracy of a pressure measuring instrument is limited by the accuracy of the pressure standard used for calibration of the pressure measuring instrument. Pressure standards of primary accuracy are traceable to those of the U.S. National Institute of Standards and Technology (NIST), formerly called the National Bureau of Standards. Pressure standards are used for several purposes including calibrating other pressure measuring instruments, directly measuring unknown pressures, and supplying reference pressures for various purposes.

The accuracy of piston-cylinder pressure gages used as primary standards is directly dependent on the precision of the size of their measuring piston or pistons and the corresponding measuring cylinders. Millionths of inches in tolerances will typically determine the accuracy of high quality pressure gages. It is necessary for the piston and annular area of the cylinder to have an extremely fine surface quality and uniform geometry over their entire length. At this level of accuracy, the existence of a fingerprint on the piston is a detectable error. The annular clearance between the piston and cylinder is in the range of five millionths of an inch. Since this clearance is so small, the piston-cylinder requires no additional seal between the piston and cylinder.

Due to the extremely fine tolerances of these piston-cylinder mechanisms, it is possible to use gas molecules rather than oil for lubrication between the piston and the cylinder. The lack of oil surface tension and friction enables the gage to operate with excellent repeatability as well as precision. In general, "gas-lubricated" pressure gages provide greater accuracy than hydraulic gages at pressures below 90 psi (630 kPa) and operate at pressures down to 0.2 psi (1.4 kPa) whereas oil gages are not desirable at pressures below 15 psi (105 kPa).

For low pressure accuracy, in which a tare error becomes significant due to the weight of the measuring piston itself, a low range piston may be made of 440 stainless steel to minimize mass of the piston and thereby reduce tare error. Tare error can be more precisely offset by use of a separate slave gage. Mid and high range pistons which are used to make measurements in pressure ranges where tare error is not as significant, are often made of tungsten carbide for optimum long-term stability, minimum distortion, and low thermal coefficient of expansion at high pressure. The corresponding measuring cylinders are also often made of tungsten carbide.

Masses used to activate the measuring piston-cylinders may be machined from nonmagnetic stainless steel for long-term stability and usually require serial numbers for identification purposes. In some cases, masses are provided with a calibration certificate traceable to the U.S. National Institute of Standards and Technology (NIST) per MIL-STD-45662 with each mass value reported to plus or minus 10 ppm or one milligram, whichever is greater.

Piston pressure gages have a number of common operational characteristics. When a pressurized fluid is applied to both ends of a piston, opposing forces of equal magnitude are exerted along the axis of the piston. When pressure is applied to only one end of the piston, the force is unbalanced and the piston moves in the opposite direction. When another force of equal magnitude, such as from a mass-load accelerated by gravity, is applied to the opposite end of the piston, the force becomes balanced and a differential pressure is established between the two ends of the piston. In principle, all piston pressure gages generate stable differential pressures by balancing the force caused by pressurization against another force such as that exerted by a mass-load in the presence of gravity.

Several terms associated with pressure metrology are used in describing measurements made with piston pressure gages. For instance, when the pressure acting on the mass-load end of the piston (reference pressure) is ambient pressure, the pressure at the opposite end of the piston is referred to as gage pressure. When the reference pressure is reduced to near zero, the pressure at the opposite end of the piston is referred to as absolute pressure. When the pressure at the end of the piston opposite the mass-load is at ambient atmospheric pressure and the pressure acting on the mass-load end of the piston is adjusted to some sub-atmospheric pressure, this sub-atmospheric pressure is referred to as negative gage pressure relative to the ambient atmospheric reference pressure at the opposite end of the piston. Although the operation of all piston pressure gages is technically differential, the term differential pressure generally refers to a measurement condition whereby the reference pressure is adjusted to some level other than near zero or atmospheric pressure. For differential pressure operation, the reference pressure is referred to as the line or static pressure.

Designs for most precision piston pressure gages are such that when generating absolute, negative gage, or differential pressures, a special chamber is installed surrounding the mass-load end of the piston so that the reference pressure can be adjusted. This design is time consuming to operate and generally requires rather elaborate mechanisms for mass manipulation (loading and/or rotation) while the chamber is installed.

Gravity acts not only on the mass-load, but also on the measuring piston, which also has a mass, and generates a downward force (in the direction of the force of gravity). When pressure is applied to the bottom of the piston to oppose the downward force from the mass of the piston alone, the pressure is known as tare pressure and is the minimum pressure obtainable without some special configuration. Numerous elaborate designs have been developed to eliminate or minimize tare pressure, yet it remains one of the significant obstacles in piston pressure gage metrology.

For differential pressure measurement, one presently available differential pressure gage uses a combination of oil and gas lubrication with the measuring piston-cylinders. This device employs three coaxially linked piston-cylinders. The middle piston-cylinder has an effective area 11 times or 101 times greater than the outer two pistons which are theoretically equal in area. An external oil pressure supply makes the mobile assembly, which includes the three pistons and their linkages, float when the value of the oil pressure acting on the lowest piston is 10 times or 100 times greater than the value of the unknown gas pressure.

While this device does produce a differential pressure, it has a number of significant problems. One major problem in using the three different pistons is in the design of linkages. These linkages are rather complicated, having up to four springs each, as well as plates, sockets, and spring struts. The linkages have a complex job to do in making up for slight errors in concentricity or coaxiality of the cylinders while still maintaining a strong enough mechanical link that the pistons move precisely in concert with each other. The linkages have weight which adds to tare error. Other problems include difficulties in making three separate pistons and cylinders with the proper relative dimensions at the level of accuracy required to avoid problems of leakage and friction. Friction wear is a problem that reduces the accuracy of the standard over time and may be accentuated due to any lack of perfection in concentricity of the cylinders with respect to each other.

Another significant problem with this type of differential pressure standard is the lack of versatility. Due to the construction of the instrument, the different size pistons in the instrument are not useable to produce dual ranges when operating the instrument to produce absolute or gage pressures. The necessity of requiring a separate pressure standard to activate the differential pressure standard is also a significant disadvantage of this machine. In producing differential pressures, it is necessary to restrict differential operation of one presently available multi-mode three-piston gage so one of the differential pressures is limited to being equal to or less than atmospheric pressure.

Two piston gages using either linkages between the pistons or telescoping sets of pistons having no linkages but rather having one measuring piston moving within another have been used to multiply, divide, and/or produce a wider range of reference pressures. A major disadvantage of these instruments, prior to this invention, is that it had not been determined how a two piston gage can be used to accurately produce or measure differential pressures. Another significant disadvantage that the two piston gages have had in the past is that in producing absolute reference pressures which require a vacuum, it has been necessary to place the masses within the vacuum.

The pressure gages described above fail to provide a sturdy differential pressure gage which has wide utility for all purposes including producing high and low range absolute and gage pressures, absolute reference pressures without breaking vacuum, negative gage pressures, and differential pressures when both static pressures may be above atmospheric pressure as well as when one or both differential pressures are equal to or below atmospheric pressure. Those skilled in the art have long sought and will appreciate the novel features of the present invention which solves these problems.

SUMMARY OF THE INVENTION

The present invention is directed to a new, novel differential pressure gage which improves on conventional three piston differential pressure gages. Two pistons are utilized to produce differential pressures without the need for the three pistons which are used in a conventional differential pressure gage. This reduction in the number of pistons creates many advantages including the elimination of the need for complex linkage mechanisms. In a preferred embodiment, reciprocal inner and outer measuring pistons are used with three corresponding highly coaxial measuring cylinder bores. The three cylinders are precisely manufactured and aligned. This machining may require, for instance, simultaneous lapping of the cylinders. An additional fourth coaxial cylinder bore extends through the outer measuring piston. The inner measuring piston is of such a length that it will extend into all of the measuring cylinders simultaneously so that only two pistons are required. This feature combined with the precise alignment of the cylinders eliminates the need for complicated linkages. In a preferred embodiment, the mass carrier may activate the inner measuring piston directly or through an intermediate carrier to eliminate the need for an external standard. Since the mass carrier will also have a built in float position indicator, the other end of the high pressure sensor is free to be used in an additional pressure chamber to provide high and low range absolute and gage measurements. In a preferred embodiment, the pressure chamber housing is also used as a housing for securing the three measuring cylinders. A retainer may be used on the inner piston to allow transmittal of pressure from the mass carrier through the inner measuring piston to the outer measuring piston. In a preferred embodiment, one or more pressure/vacuum control modules are attached to one or more ports on the gage. Common applications of this device provide for high and low range gage pressures, high and low range absolute pressures, and negative gage pressures. When applications require use of vacuums, masses may be changed without breaking vacuum. Differential pressure applications are available regardless of whether static pressure is below or above atmospheric pressure. The present invention also provides a simple means to eliminate tare pressure without adversely affecting performance. The present invention therefore represents a large step forward in technology by providing the most versatile pressure standard available while significantly decreasing the mechanical complexity of differential pressure gages in general.

BRIEF DESCRIPTION OF THE DRAWINGS

Other features and intended advantages of the present invention will be readily apparent by the references to the following detailed description in connection with the accompanying drawings, wherein.

While the invention will be described in connection with the presently preferred embodiment, it will be understood that it is not intended to limit the invention to this embodiment. On the contrary, it is intended to cover all alternatives, modifications and equivalents as may be included in the spirit of the invention.

DETAILED DESCRIPTION OF THE PREFERRED EMBODIMENT

Figure 1:
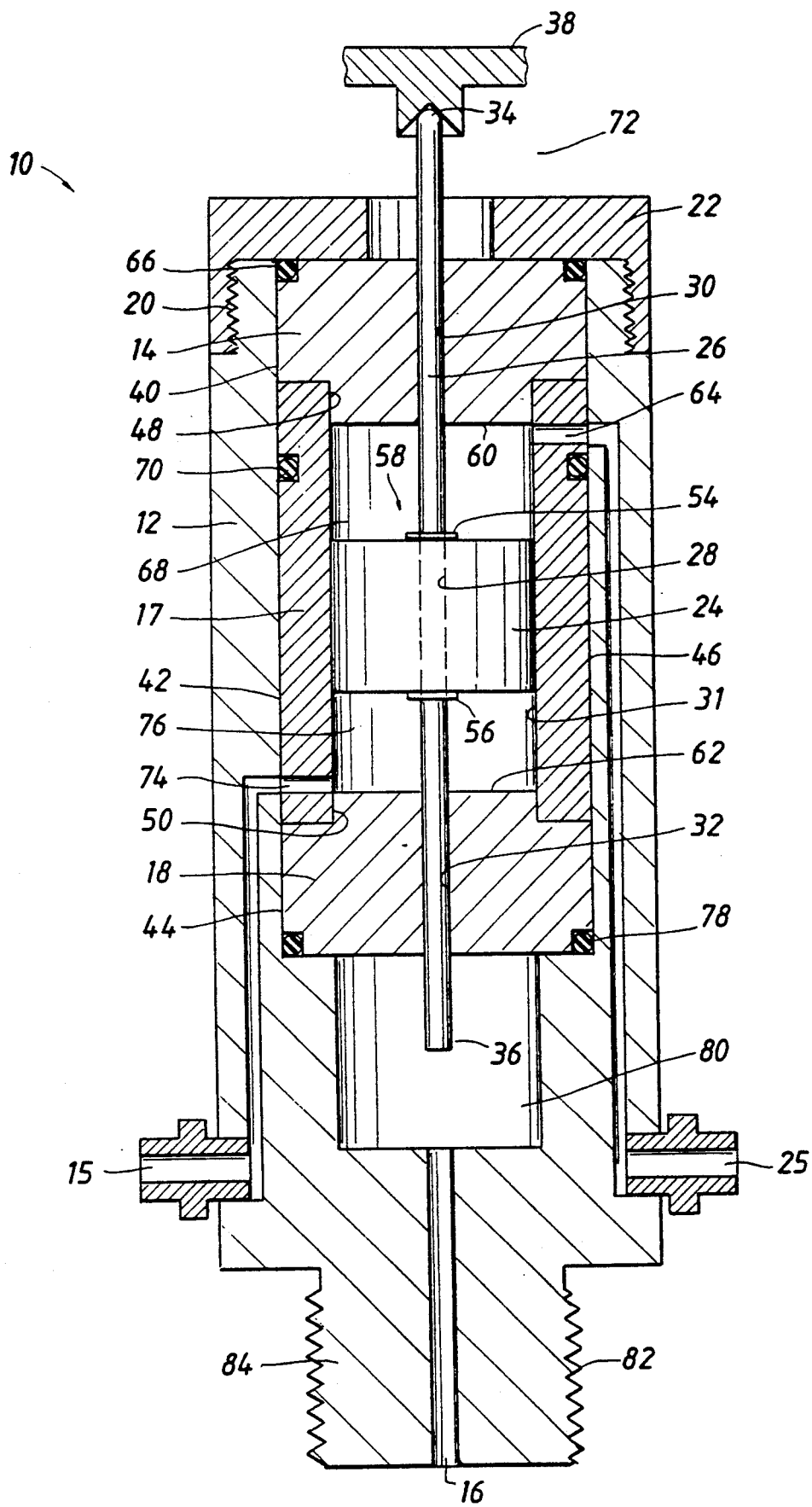
FIG. 1 is an elevational view, partially in section, of a differential pressure gage in accord with the present invention.

The differential pressure gage of the present invention retains all the advantages of three-piston differential pressure gages while simplifying mechanical complexity and reducing the need for advanced skill level operators. The present invention employs only two pistons which operate simultaneously thereby eliminating complex linkages and providing two pressure ranges as well as multiple modes of operation in a single compact assembly. The main internal components of differential pressure gage 10, according to a preferred embodiment of the present invention, are shown in FIG. 1. The design of differential pressure gage 10 simplifies all modes of operations and allows for two pressure ranges to be obtained using only one assembly. This design eliminates the need for a reference pressure chamber for operation with absolute, negative gage, and differential pressures. It also provides a simple means to eliminate tare pressure without adversely affecting performance.

Referring to FIG. 1, pressure housing 12 provides alignment for measuring cylinders 14, 17, and 18 as discussed hereinafter. Threads 20 on pressure housing 12 engage complimentary threads on retaining cap 22 to secure retaining cap 22 onto pressure housing 12. Outer piston 24 has an outside diameter substantially equivalent to the diameter of bore 31 within measuring cylinder 17. Bores 28, 30, and 32 extend respectively through outer piston 24 and measuring cylinders 14 and 18. Bores 28, 30, and 32 each have a diameter substantially equivalent to the diameter of inner piston 26. Inner piston 26 has sufficient length to extend through bore 28 of outer piston 24 and bores 30 and 32 of measuring cylinders 14 and 18, respectively, so that under normal operating conditions, neither end 34 or 36 of inner piston 26 will enter or exit bores 30 and 32. The length of inner piston 26 is also sufficient to allow mass-loading end 34 to be used as a means of supporting an externally applied mass-load as upon mass carrier 38. The outside diameter of outer cylindrical walls 40 and 44 of measuring cylinders 14 and 18, respectively, are substantially equivalent to the outside diameter of outer wall 46 of measuring cylinder 17 and to the inside diameter 42 of pressure housing 12 for alignment purposes. In the preferred embodiment, the centerlines of outer walls 40, 44, and 46, as well as bores 30, 31, and 32 of measuring cylinders 14, 17, and 18, bore 28 of outer piston 24, and the diameter of inner piston 26 are highly coaxial. The diameters of alignment walls 48 and 50 of are substantially equivalent to the diameter of bore 31 of measuring cylinder 17 to provide precise alignment required for critical coaxial alignment of measuring cylinders 14, 17, and 18. In a preferred embodiment, outer piston 24 is substantially fixed about a center portion of inner piston 26 via retainers 54 and 56. Outer piston 24, inner piston 26, and retainers 54 and 56, are hereinafter referred to as piston assembly 58. Piston assembly 58 reciprocates within bores 30, 31, and 32 of respective measuring cylinders 14, 17, and 18. Travel of piston assembly 58 is limited within bore 31 of measuring cylinder 17 by end surfaces 60 and 62 of respective measuring cylinders 14 and 18. At this time, the preferred embodiment of piston assembly 58 is one of component form rather than monolithic construction to avoid the high cost of alignment problems that are presently associated with monolithic construction.

Pressure or vacuum applied via port 25 through passageway 64 to pressure chamber 68 is substantially isolated by seal 66 from pressure or vacuum applied to reference pressure region 72 and is also substantially isolated by seal 70 from pressure or vacuum applied via port 15 through passageway 74 to pressure chamber 76. Pressure or vacuum in pressure chamber 76 is substantially isolated by seal 78 from pressure or vacuum applied via port 16 to pressure chamber 80. Threads 82 on pressure housing neck 84 secure pressure housing 12 to a manifold adaptor (not shown) which incorporates a seal to substantially isolate pressure or vacuum applied to pressure chamber 80 from ambient atmospheric pressure. Pressure or vacuum applied to pressure chambers 68 and/or 76 and/or 80 in such a way as to force piston assembly 58 in the direction of mass carrier 38 is balanced by an oppositely directed force from some mass-load (not shown), accelerated by gravity, mounted at mass-load end 34 of piston assembly 58.

Figure 2:
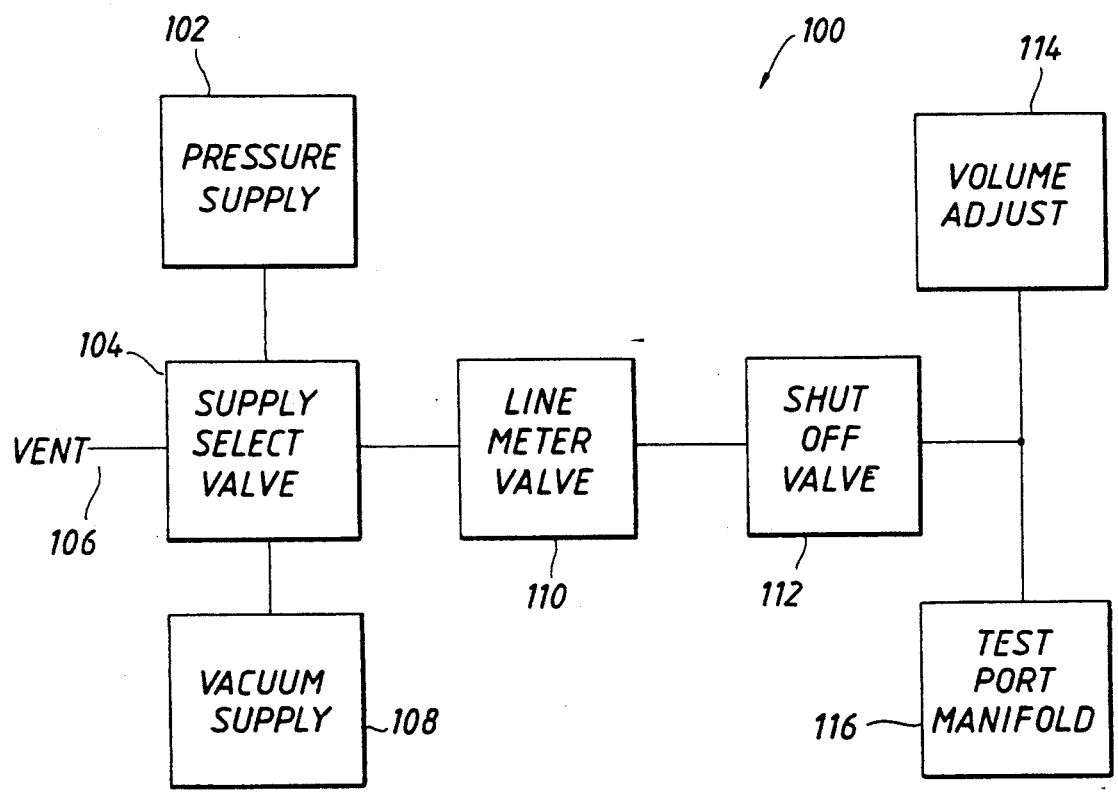
FIG. 2 is diagrammatic view of a pressure/vacuum control supply module used in accord with the present invention.

Table I, entitled Basic Modes of Operation, shows which ports of differential pressure gage 10 are used for each range and mode of operation. All unused ports should be open to ambient atmospheric pressure. Note that Table I only includes information for the most common applications and is used only to demonstrate the special characteristics and high versatility of differential pressure gage 10. One, two, or three Pressure/Vacuum Supply (PVS) Modules 100, as shown in FIG. 2, may be required for operation of pressure gage 10 depending on the selected mode of operation. PVS modules 100 are widely available as standard products or can be assembled using valves and fittings readily available from many manufacturers. PVS Module 100 connects to ports 15, 25, and/or 16 via test port manifold 116. Volume adjust 114, shut off valve 112, and fine meter valve 110 control flow between supply select valve 104 and test port manifold 116. Supply select valve 104 may select either pressure supply 102, vent 106, or vacuum supply 108, as desired, for connection to test port manifold 116.

In the Gage mode section of Table I, the first entry applies to low range operation. In this configuration, one PVS module 100 applies pressure to port 15. This configuration is limited by tare pressure and, in a preferred embodiment, has an approximate pressure range of 0.25 to 50.0 psi. The next two configurations are also low range modes but the tare pressure is eliminated (zero tare). The first of these two methods uses a second PVS module 100 to apply a highly stable vacuum (approximately 10 mTorr) to port 25. A mass-load (not shown) is then applied to piston assembly 58 to balance the force on measuring piston 24 as ambient atmospheric pressure is applied to port 15. Very low gage pressures can then be generated by making small changes in the mass-load and adjusting the pressure to obtain equilibrium using the PVS module connected to port 15. The second zero tare configuration uses a second PVS module to apply a highly stable, positive gage pressure (approximately 60 psi in a preferred embodiment) to port 16. Again, the mass-load is adjusted with ambient atmospheric pressure applied to port 15 and very low gage pressures can be generated by making small changes in the mass-load and adjusting the pressure to obtain equilibrium using the PVS module connected to port 15. In all modes of operation where port 16 is used to establish zero tare, the most precise pressure is obtained when the pressure applied to port 16 is regulated using a second piston pressure gage. In the high range gage mode, one PVS module 100 is connected to port 16 while ports 15 and 25 are open to ambient atmosphere. In a preferred embodiment, the approximate pressure range in this configuration is 10 to 2500 psi. Due to the relative ease of switching to the low range mode for making measurements with zero tare, no zero tare mode is needed for high range operation.

The next section of Table I shows the necessary connections for high range, low range, and zero tare low range operation in the absolute mode. In the absolute mode, a highly stable vacuum (approximately 10 mTorr) is applied to port 25 using one PVS module 100. Another PVS module 100 is connected to port 15 for low range operation, or to port 16 for high range operation. In the low range configuration, a highly stable positive pressure can be applied using a third PVS module 100 connected to port 16 to operate in the zero tare low range absolute mode. Pressure ranges in the absolute mode are essentially the same as for gage mode configurations.

There are two configurations for negative gage pressure operation. With one PVS module 100 connected to port 25, negative gage mode with a pressure range of minus 0.25 psi (tare pressure) to minus 1 atmosphere is obtained. As with gage and absolute modes of operation, a highly stable positive pressure can be applied to port 16 using another PVS module for zero tare negative gage mode operation.

The final section of Table I shows the appropriate connections for differential modes of operation. One PVS module 100 is connected to port 15 and another to port 25. This configuration will result in a pressure range of 0.25 to 50 psi differential pressure with a static or line pressure from vacuum to 2500 psi. A third PVS module 100 can be connected to apply a highly stable positive pressure to port 16 to establish zero tare differential pressures.

The foregoing description of the invention has been directed in primary part to a particular, preferred embodiment in accordance with the requirements of the patent statutes and for purposes of illustration. It will be apparent, however, to those skilled in the art that many modifications and changes in the specifically described pressure gage 10 may be made without departing from the scope and spirit of the invention. Those skilled in the art may make modifications including variations of piston sizes and stroke, use of different and/or additional pressure taps to the measuring bores, and using different retaining means such as shoulders, pins, or restrictions for restricting movement of either the inner or outer piston. It may be desired in some cases, to have a single retainer allowing inner piston 26 reciprocation within outer piston 24 or to align the measuring cylinders using another technique. Therefore, the invention is not restricted to the preferred embodiment illustrated but covers all modifications which may fall with the spirit of the invention.

TABLE I

| | Basic Modes of Operation | | | | | |
| --- | --- | --- | --- | --- | --- | --- |
| | | ZERO | PVS PORT | | | |
| MODE | RANGE | TARE | 15 | 16 | 25 | NOTES |
| GAGE | LOW | | | XX | | |
| GAGE | LOW | XX | XX | | XX | 1 |
| GAGE | LOW | XX | XX | XX | | 2 |
| GAGE | HIGH | | | XX | | |
| ABSOLUTE | LOW | | XX | | XX | 1 |
| ABSOLUTE | LOW | XX | XX | XX | XX | 1,2 |
| ABSOLUTE | HIGH | | | XX | XX | 1 |
| NEGATIVE GAGE | LOW | | | | XX | |
| NEGATIVE GAGE | LOW | XX | | XX | XX | 2 |
| DIFFERENTIAL | LOW | | XX | | XX | |
| DIFFERENTIAL | LOW | XX | XX | XX | XX | |

Note 1: Port 25 regulated at approximately 10 mTorr.
Note 2: Port 16 regulated at approximately 60 psig.

What is claimed is:

1. A pressure standard, comprising:
first and second measuring cylinder housings fixably secured together and aligned so that corresponding first and second bores within said respective measuring cylinder housings are coaxial with respect to each other;
an outer measuring piston reciprocal within said second bore and having an outside diameter substantially equal to the diameter of said second bore, said outer piston having a fourth bore therein coaxial with said first and second bores; and
an inner measuring piston extending into said first and fourth bores, said inner measuring piston having a diameter substantially equal to the diameter of said first bore.

2. The apparatus of claim 1, wherein:
said first and fourth bore are substantially equal in diameter.

3. The apparatus of claim 1, wherein:
said fourth bore extends through said outer piston.

4. The apparatus of claim 1, further comprising:
a third measuring cylinder housing having a third bore and being secured to said second measuring cylinder housing, said second measuring cylinder housing being between said first and third measuring cylinder housings, said inner piston being moveable within said third bore.

5. The apparatus of claim 4, wherein:
said first and third bores are substantially equal in diameter to each other.

6. The apparatus of claim 4, wherein:
said inner piston has a diameter substantially equal to the diameter of said first, third, and fourth bores and a length sufficient to allow said inner piston to extend simultaneously into said first, second, third and fourth bores.

7. The apparatus of claim 4, further comprising:
a pressure chamber housing fixably secured to said first, second, and third cylinder housings and having a pressure chamber therein, said pressure chamber being in communication with said third bore, said pressure chamber having a pressure port communicating with said pressure chamber.

8. The apparatus of claim 7, wherein:
said inner piston has a pressure end movable in said pressure chamber.

9. The apparatus of claim 7, wherein:
said first, second, and third measuring cylinders have cylindrical outer surfaces which are substantially coaxial with said first, second, and third bores.

10. The apparatus of claim 9, further comprising:
a cylindrical inner alignment surface on said first and third measuring cylinders, said alignment surface having an outside diameter substantially equal to the diameter of said second bore.

11. The apparatus of claim 1, further comprising:

a retaining means operative to limit reciprocal movement of said inner piston with respect to said outer piston.

12. The apparatus of claim 1, wherein:

said inner piston has a length sufficient for supporting said mass carrier means in opposition to said first force.

13. The apparatus of claim 1, further comprising:

an alignment surface disposed on said first measuring cylinder housings operative to align said first and second bores coaxially with each other.

14. A pressure standard, comprising:

first, second, and third cylinder housings fixably secured together and having corresponding first, second, and third bores, said second cylinder housing being between said first and third cylinder housings, said first and second bores being coaxial with respect to each other;

an outer piston reciprocal within said second bore;

an inner piston affixed to said outer piston and extending simultaneously into said first, second, third bores;

a pressure chamber housing fixably secured to said first, second, and third cylinder housings and having a pressure chamber contained therein, said pressure chamber having a pressure port communicating with said pressure chamber, said inner piston being movable within said pressure chamber;

said first and third bores have a diameter substantially equal to each other and smaller than said second bore diameter, said inner piston having a diameter substantially equivalent to said first and third bores;

retaining means for securing said inner piston to said outer piston, said retaining means securing said inner piston from movement within a fourth bore extending through said outer piston; and a mass carrier, said inner piston having a length sufficient for supporting said mass carrier in opposition to a force acting on said mass carrier, said outer piston connecting through said retaining means to said inner piston for opposing said force acting on said mass carrier.

15. The apparatus of claim 14, wherein:

said first, second, and third cylinder housings each have a cylindrical alignment surface coaxial to said first, second, and third bores, and said inner and outer pistons.

16. A pressure standard, comprising:

first, second, and third cylinder housings fixably secured together and aligned so that corresponding first, second, and third bores within said respective cylinder housings are coaxial with each other, said second cylinder housing being between said first and third cylinder housings, said first, second, and third cylinder housings having a pressure region therein, said pressure region having an inlet connection for communicating with said pressure region;

a piston assembly reciprocal within said second bore, said piston assembly having an outer piston portion with an outside diameter substantially equal to the bore of said second cylinder housing, said piston assembly having an inner piston portion rigidly carried by said outer piston portion and reciprocal within said first and third bores, said inner piston portion having a diameter substantially equal to said first bore; and a mass carrier, said inner piston having a length sufficient for supporting said mass carrier in opposition to a first force acting on said mass carrier, said inner piston being responsive to a second force produced as a result of a pressure within said pressure region.

17. The apparatus of claim 16, further comprising:

alignment surfaces for coaxially aligning said first, second, and third bores.

18. The apparatus of claim 16, further comprising:

a pressure chamber housing defining therein a pressure chamber, said inner piston being movable within said pressure chamber.

* * * * *

UNITED STATES PATENT AND TRADEMARK OFFICE
CERTIFICATE OF CORRECTION

PATENT NO. : 5,259,235
DATED : November 9, 1993
INVENTOR(S) : Kenneth A. Kolb

It is certified that error appears in the above-indentified patent and that said Letters Patent is hereby corrected as shown below:

In column 8, line 17, delete ";" and insert therefor --, said first and second measuring cylinder housings having a pressure region therein, said pressure region having an inlet connection for communicating with said pressure region;--

In column 8, line 22, delete "and".

In column 8, line 26, delete "." and insert therefor --;
mass carrier means operative to apply a first force to at least one of said inner or outer measuring pistons in opposition to a second force produced as a result of a pressure within said pressure region.--

Signed and Sealed this

Sixth Day of June, 1995

Attest:

BRUCE LEHMAN

Attesting Officer

Commissioner of Patents and Trademarks